US008370458B2

(12) United States Patent
Cheriton

(10) Patent No.: US 8,370,458 B2
(45) Date of Patent: Feb. 5, 2013

(54) HIERARCHICAL BLOCK-IDENTIFIED DATA COMMUNICATION FOR UNIFIED HANDLING OF STRUCTURED DATA AND DATA COMPRESSION

(75) Inventor: David R. Cheriton, Palo Alto, CA (US)

(73) Assignee: Hicamp Systems, Inc., Menlo Park, CA (US)

( * ) Notice: Subject to any disclaimer, the term of this patent is extended or adjusted under 35 U.S.C. 154(b) by 1082 days.

(21) Appl. No.: 12/317,375

(22) Filed: Dec. 19, 2008

(65) Prior Publication Data

US 2009/0164754 A1 Jun. 25, 2009

Related U.S. Application Data

(60) Provisional application No. 61/008,657, filed on Dec. 21, 2007.

(51) Int. Cl.
*G06F 15/16* (2006.01)
(52) U.S. Cl. ............................. 709/219; 712/29; 711/152
(58) Field of Classification Search .................. 709/219; 712/29, 31; 711/152
See application file for complete search history.

(56) References Cited

U.S. PATENT DOCUMENTS

| | | | |
|---|---|---|---|
| 4,695,949 A | 9/1987 | Thatte et al. | |
| 4,989,137 A | 1/1991 | Oxley et al. | |
| 5,247,634 A | 9/1993 | Cline et al. | |
| 5,784,699 A | 7/1998 | McMahon et al. | |
| 5,864,867 A | 1/1999 | Krusche et al. | |
| 5,941,959 A * | 8/1999 | Fishler et al. ................... | 710/33 |
| 5,950,231 A | 9/1999 | Nichol | |
| 6,477,544 B1 | 11/2002 | Bolosky et al. | |
| 6,928,488 B1 | 8/2005 | de Jong et al. | |
| 7,325,226 B2 | 1/2008 | Pepin et al. | |
| 7,386,752 B1 * | 6/2008 | Rakic et al. ...................... | 714/2 |
| 7,725,437 B2 * | 5/2010 | Kirshenbaum et al. ....... | 707/640 |
| 7,805,409 B2 * | 9/2010 | Manczak et al. .............. | 707/638 |
| 7,949,668 B2 * | 5/2011 | Holcombe et al. ............ | 707/758 |
| 2003/0018878 A1 * | 1/2003 | Dorward et al. .............. | 711/216 |
| 2003/0131348 A1 | 7/2003 | Hogstrom | |
| 2011/0196900 A1 * | 8/2011 | Drobychev et al. ........... | 707/812 |

OTHER PUBLICATIONS

Chang et al., "Bigtable: A distributed Storage System for Structured Data" OSDI 2006.
Dennis, J.B., Fresh Breeze: A multiprocessor chip architecture guided by modular programing principles, 2003, pp. 7-15, ACM Sigarch Computer Architecture News, v31.
Walpole, J. et al., Maintaining Consistency in Distributed Software Engineering Environments, 1998, pp. 418-425, 8th Intl. Conf. on Distributed Computing Systems.

* cited by examiner

*Primary Examiner* — Kevin Bates
(74) *Attorney, Agent, or Firm* — Van Pelt, Yi & James LLP

(57) ABSTRACT

Data transmission efficiency for structured data can be improved by representing structured data using immutable blocks. The contents of the immutable blocks can include data and/or pointers to immutable blocks. An immutable data block cannot be altered after creation of the block. When data represented as immutable blocks is transmitted from one processor to another processor, the transmitter sends block contents for blocks that have not previously been defined at the receiver, and sends block IDs (as opposed to block contents) for blocks that have previously been defined at the receiver. The systematic use of block IDs instead of block contents in transmission where possible can significantly reduce transmission bandwidth requirements.

20 Claims, No Drawings

HIERARCHICAL BLOCK-IDENTIFIED DATA COMMUNICATION FOR UNIFIED HANDLING OF STRUCTURED DATA AND DATA COMPRESSION

CROSS REFERENCE TO RELATED APPLICATIONS

This application claims the benefit of U.S. provisional patent application 61/008,657, filed on Dec. 21, 2007, entitled "Hierarchical Block-identified Data Communication for Unified Handling of Structured Data and Data Compression", and hereby incorporated by reference in its entirety.

FIELD OF THE INVENTION

This invention relates to data communication between processors or computers.

BACKGROUND

Coupled computer systems with separate memory systems arise in various settings, ranging from loosely coupled multiprocessor systems to large-scale distributed systems, such as the Internet. The coupling of these systems can be regarded as maintaining shared data between the processors. For instance, if one processor provides a file service, another processor may be running an application that requires access to data contained in these files, and thus needs the data shared with it. When a file is changed, the application must be able to reread the file and thereby read the new data. Similarly, in a distributed computer game, a change in geometry of some object in the virtual world needs to be communicated to each player that has visibility to that object.

Conventionally, data sharing is achieved by either pushing or pulling the data. In the former case, the holder of the data recognizes the receiver needs to have a copy of this data, and then serializes and transmits the data it believes is of interest to the receiver. In the latter case, the node interested in the data requests the data by some form of identification, such as file and offset, and the holder of the data responds as above. Typically, data objects are transmitted in their entirety. However, this can lead to unbounded bandwidth requirements relative to the amount of data being modified. For example, the modification of a single byte in a file can result in the entire contents of the file being retransmitted. Similarly, the change of a single parameter in a geometric description of an object in a virtual world can result in the entire description being retransmitted. The use of conventional data compression techniques on such serialized data does not completely address the underlying inefficiency of retransmitting an entire large data object which has only had a small modification.

Data objects are commonly "structured" in the sense of being a non-linear structure that contains pointers to subportions, which may be shared between data objects or may be referenced multiple times within one data object. Conventionally, a structured data object is serialized as part of transmission, sometimes simply including the actual data of a subobject in place of each reference. In other cases, each pointer is translated to some high-level network pointer representation and that representation is transmitted over the network. Typically, this requires transmitting a definition or designation of the object over the network and associating it with an object ID, and then transmitting the object ID as a network representation of the pointer to this object. To reduce bandwidth, the resulting serialized data can be compressed. However, this conventional approach of doing serialization and compression separately can incur substantial overhead on transmission as well as on reception of structured data, as a result of translating the data to and from the network representation.

Accordingly, it would be an advance in the art to provide more efficient processor to processor transmission of structured data.

SUMMARY

Data transmission efficiency for structured data can be improved by representing structured data using immutable blocks. The contents of the immutable blocks can include data and/or pointers to immutable blocks. An immutable data block cannot be altered after creation of the block. However, the property of immutability does not prevent deletion of an immutable block (e.g., immutable blocks can be deallocated when they are no longer referenced). When data represented as immutable blocks is transmitted from one processor to another processor, the transmitter sends block contents for blocks that have not previously been defined at the receiver, and sends block IDs (as opposed to block contents) for blocks that have previously been defined at the receiver.

The systematic use of block IDs instead of block contents in transmission where possible can significantly reduce transmission bandwidth requirements. This substitution of block ID for block contents is enabled by the use of immutable blocks, because it is block immutability that eliminates the possibility of block contents changing. This is the reason it is sufficient to determine whether or not a block has previously been defined at the receiver in order to know whether or not block contents need to be transmitted. The blocks can be regarded as units of data, and the block IDs can be regarded as machine-independent pointers.

This approach provides several significant advantages. First, the information to be transmitted can be bounded to be on the order of the actually changed data (or a single block size, whichever is greater), in contrast to conventional approaches where no such bound usually exists. Second, bandwidth consumption is reduced relative to conventional approaches, leading to reduced response times in distributed applications and less network congestion. Third, the internal state representation and communication representation of data objects can be efficiently mapped to each other in cases where the internal state representation is also in terms of immutable blocks.

In more detail, the above-described principles can be regarded as providing a method for transmitting data from a first processor to a second processor. Here the first and second processors can be separate computers (either co-located or remote from each other), or they can be processors within a single computer system (e.g., an architecture with multiple processor cores). Some or all of the data on the first and second processors is represented with data structures consisting of immutable blocks. Contents of the immutable blocks can include data and/or pointers to immutable blocks. Preferably, the immutable block data structures are organized as directed acyclic graphs.

Data being transferred from the first processor to the second processor is represented as one or more of these data structures, and the immutable blocks of these data structures being transferred are referred to as transfer blocks. A determination is made for each transfer block of whether it is a member of a first set of transfer blocks that have not previously been defined at the second processor or if it is a member of a second set of transfer blocks that have previously been defined at the second processor. For transfer blocks in the first set, their block contents are transmitted to the second processor. For transfer blocks in the second set, their block identification is transmitted to the second processor.

At the first processor and/or at the second processor, a mapping of virtual block ID to physical block ID can be maintained. Here the physical block ID is the identifier associated with an immutable block, and so physical block IDs are effectively immutable. The mapping of virtual block ID to physical block ID is mutable.

The second processor can maintain local mappings for physical block IDs and/or virtual block IDs. More generally, any receiver processor can maintain local mappings for physical block IDs and/or virtual block IDs.

In some situations, it can be desirable to maintain a system wide labeling of the immutable blocks in a system including at least said first and second processors. One way to maintain such a system-wide labeling is to designate one processor as a master processor at which the system-wide physical block IDs are assigned to immutable blocks, and where the mapping of virtual block IDs to physical block IDs is provided. The remaining processors in the system can be designated as slave processors, which use temporary block IDs as necessary to refer to blocks, and automatically replace these temporary block IDs with equivalent block IDs as provided by the master processor (e.g., using an asynchronous block ID update protocol).

The present approach can be embodied by a computer or computer systems programmed to perform these communication methods. Another embodiment is as a set of computer instructions readable and executable from a computer readable medium, such as magnetic, optical or semiconductor storage media.

DETAILED DESCRIPTION

A. Examples

Certain aspects of the present approach can be better appreciated by consideration of some examples. In Example 1, a block representation of a sentence 'the cat ate the dog' is considered. Table 1 shows one possible arrangement of blocks in the memory of a first processor (referred to as processor A), for the sentence of Example 1.

TABLE 1

Representation of 'the cat ate the dog'

| PID | block contents | represents |
| --- | --- | --- |
| P1 | "the" | |
| P2 | "cat" | |
| P3 | "ate" | |
| P4 | "dog" | |
| P5 | P1, P2 | 'the cat' |
| P6 | P5, P3 | 'the cat ate' |
| P7 | P1, P4 | 'the dog' |
| P8 | P6, P7 | 'the cat ate the dog' |

Here the column labeled "PID" gives the physical block ID (often abbreviated as pBlockId in the following description), the column labeled "block contents" gives the block contents, and the column labeled "represents" gives the sentence represented by the block, for blocks containing pointers. Block immutability has several implications. One is that the contents of a block cannot be directly changed (i.e., "the" cannot be changed to "a" in block P1). Another is that the association of pBlockIds to block contents cannot be altered (e.g., the pBlockId of the "cat" block cannot be changed from P2 to P10).

In this example, the blocks are organized as a binary directed acyclic graph (DAG). The data structure of this example is not a tree because two blocks point to block P1 to account for re-use of the "the" block in the example sentence. Although the use of tree-like DAGs is preferred for efficiency, many other data structures can also be represented and transmitted as immutable blocks. In some cases, a variable fan-out DAG can be employed, by packing more than 2 blockIds into the blocks if they fit.

Transmission of this block-represented sentence from processor A to another processor (referred to as processor B) can be implemented with a protocol that includes the following messages (message arguments are in ( ) following message name), each described in terms of what the receiving processor does upon message receipt.

1) reqBlock(pBlockId)—the receiver looks up the pBlockId and sends back a defBlock message with the pBlockId and associated contents.

2) defBlock(pBlockId, contents)—the receiver looks up the contents in its memory to get a local pBlockId, allocating and initializing a local block if necessary. If the local pBlockId differs from the pBlockId provided by the transmitter, the receiver keeps track of the mapping of the transmitter pBlockId to the local pBlockId. The explicit pBlockId in this message allows it to be used to push data, as opposed to merely responding to queries.

In this example, the message traffic in transmitting the indicated sentence from processor A to processor B could be as follows in Table 2, assuming no blocks for "the", "cat", "dog" or "ate" are already defined at processor B when transmission starts.

TABLE 2

Message steps for Example 1.

| step | direction | message |
| --- | --- | --- |
| 1 | A to B | defBlock P8 is P6, P7 |
| 2 | B to A | reqBlock P6 |
| 3 | A to B | defBlock P6 is P5, P3 |
| 4 | B to A | reqBlock P3 |
| 5 | A to B | defBlock P3 is "ate" |
| 6 | B to A | reqBlock P5 |
| 7 | A to B | defBlock P5 is P1, P2 |
| 8 | B to A | reqBlock P1 |
| 9 | A to B | defBlock P1 is "the" |
| 10 | B to A | reqBlock P2 |
| 11 | A to B | defBlock P2 is "cat" |
| 12 | B to A | reqBlock P7 |
| 13 | A to B | defBlock P7 is P1, P4 |
| 14 | B to A | reqBlock P4 |
| 15 | A to B | defBlock P4 is "dog" |

Note that in step 13, where processor B is told that block P7 refers to blocks P1 and P4, block P1 has already been defined at processor B as a result of step 9. Therefore, after step 13, it is not necessary to transmit block contents of P1 again.

In Example 2, the consequences of changing 'the cat ate the dog' to 'the mouse ate the dog' in Example 1 are considered.

TABLE 3

Representation of 'the mouse ate the dog'

| PID | block contents | represents |
|---|---|---|
| P1 | "the" | |
| P2 | "cat" | |
| P3 | "ate" | |
| P4 | "dog" | |
| P5 | P1, P2 | 'the cat' |
| P6 | P5, P3 | 'the cat ate' |
| P7 | P1, P4 | 'the dog' |
| P8 | P6, P7 | 'the cat ate the dog' |
| P9 | "mouse" | |
| P10 | P1, P9 | 'the mouse' |
| P11 | P10, P3 | 'the mouse ate' |
| P12 | P11, P7 | 'the mouse ate the dog' |

Table 3 shows the block representation at processor A of the new sentence. In addition to a new "mouse" block (P9), new blocks P10, P11, and P12 are required to account for the changed block pointers.

Transmitting this change to processor B can be accomplished with the message steps shown in Table 4.

TABLE 4

Message steps for Example 2.

| step | direction | message |
|---|---|---|
| 1 | A to B | defBlock P12 is P11, P7 |
| 2 | B to A | reqBlock P11 |
| 3 | A to B | defBlock P11 is P10, P3 |
| 4 | B to A | reqBlock P10 |
| 5 | A to B | defBlock P10 is P1, P9 |
| 6 | B to A | reqBlock P9 |
| 7 | A to B | defBlock P9 is "mouse" |

In transmitting this update to processor B, new definitions are needed for blocks P12, P11, P10, and P9. Blocks P1, P3 and P7 are already defined at processor B, and so do not have their contents transmitted from A to B in the steps of Table 4, even though the defBlocks of Table 4 refer to blocks P1, P3, and P7.

TABLE 5

Representation of 'the cat ate up the dog'

| PID | block contents | represents |
|---|---|---|
| P1 | "the" | |
| P2 | "cat" | |
| P3 | "ate" | |
| P4 | "dog" | |
| P5 | P1, P2 | 'the cat' |
| P6 | P5, P3 | 'the cat ate' |
| P7 | P1, P4 | 'the dog' |
| P8 | P6, P7 | 'the cat ate the dog' |
| P9 | "up" | |
| P10 | P5, P11 | 'the cat ate up' |
| P11 | P3, P9 | 'ate up' |
| P12 | P10, P7 | 'the cat ate up the dog' |

In Example 3, the consequences of changing 'the cat ate the dog' to 'the cat ate up the dog' in Example 1 are considered. Table 5 shows the block representation at processor A of the new sentence. In addition to a new "up" block (P9), new blocks P10, P11, and P12 are required to account for the changed block pointers. Transmitting this change to processor B can be accomplished with the message steps shown in Table 6.

TABLE 6

Message steps for Example 3.

| step | direction | message |
|---|---|---|
| 1 | A to B | defBlock P12 is P10, P7 |
| 2 | B to A | reqBlock P10 |
| 3 | A to B | defBlock P10 is P5, P11 |
| 4 | B to A | reqBlock P11 |
| 5 | A to B | defBlock P11 is P3, P9 |
| 6 | B to A | reqBlock P9 |
| 7 | A to B | defBlock P9 is "up" |

In transmitting this update to processor B, new definitions are needed for blocks P12, P11, P10, and P9. Blocks P3, P5 and P7 are already defined at processor B, and so do not have their contents transmitted from A to B in the steps of Table 6, even though the defBlocks of Table 6 refer to blocks P3, P5, and P7.

In the preceding examples, data transmission efficiency is increased by avoiding the re-transmission of block contents for blocks which are defined at the receiver. This increase in efficiency is preferably further enhanced by introducing a mapping of virtual block IDs (vBlockIds) to pBlockIds. This mapping is mutable, so the vBlockId mapped to a particular pBlockId can be changed. Each receiver can maintain, per inbound connection, such a mapping which is referred to as the VPBCM (virtual-to-physical block connection map). As can be seen from the following examples, this provides a useful degree of flexibility without sacrificing the key advantages of the use of immutable blocks.

To accommodate the use of vBlockIds, the example protocol described above can be augmented with two additional messages as follows.

3) reqRef(vBlockId)—the receiver looks up the vBlockId to determine its associated pBlockId and sends back a defRef with these values.

4) defRef(vBlockId, pBlockId)—the receiver checks whether the vBlockId is already defined in the receiver's VPBCM, allocating and mapping a local vBlockId if necessary. If the local vBlockId differs from the vBlockId provided by the transmitter, the receiver keeps track of the mapping of the transmitter vBlockId to the local vBlockId. The local vBlockId is mapped to the local pBlockId corresponding to the pBlockId specified in the message. If necessary, the definition of the pBlockId specified in the message is requested from the transmitter (via a reqBlock message).

Examples 4-6 correspond to the use of vBlockIds in Examples 1-3 respectively. In Example 4, representation of the sentence of Example 1 using vBlockIds is considered.

TABLE 7

Representation of 'the cat ate the dog'

| VID | PID | block contents | represents |
|---|---|---|---|
| V1 V5 | P1 | "the" | |
| V2 | P2 | "cat" | |
| V3 | P3 | "ate" | |
| V4 | P4 | "dog" | |
| | P5 | V1, V2 | 'the cat' |
| | P6 | P5, V3 | 'the cat ate' |
| | P7 | V5, V4 | 'the dog' |
| V0 | P8 | P6, P7 | 'the cat ate the dog' |

Here the column labeled VID shows the vBlockIds mapped to some of the pBlockIds of this example. Often it is preferred, as shown here, to only map vBlockIds to pBlockIds of top level blocks (i.e., P8) and to pBlockIds of bottom level blocks (i.e., P1, P2, P3, P4). However, it is not required to follow this convention.

Note that the mapping of vBlockId to pBlockId can map multiple vBlockIds to a single pBlockId (e.g., V1 and V5 in this example). This allows for the possibility of independently altering either or both instances of "the" in the sample sentence by remapping V1 and/or V5.

In this example, the message traffic in transmitting the indicated sentence from processor A to processor B could be as follows in Table 8, assuming no blocks for "the", "cat", "dog" or "ate" are already defined at processor B when transmission starts.

TABLE 8

Message steps for Example 4.

| step | direction | message |
|---|---|---|
| 1 | A to B | defRef V0 P8 |
| 2 | B to A | reqBlock P8 |
| 3 | A to B | defBlock P8 is P6, P7 |
| 4 | B to A | reqBlock P6 |
| 5 | A to B | defBlock P6 is P5, V3 |
| 6 | B to A | reqRef V3 |
| 7 | A to B | defRef V3 P3 |
| 8 | B to A | reqBlock P3 |
| 9 | A to B | defBlock P3 is "ate" |
| 10 | B to A | reqBlock P5 |
| 11 | A to B | defBlock P5 is V1, V2 |
| 12 | B to A | reqRef V1 |
| 13 | A to B | defRef V1 P1 |
| 14 | B to A | reqBlock P1 |
| 15 | A to B | defBlock P1 is "the" |
| 16 | B to A | reqRef V2 |
| 17 | A to B | defRef V2 P2 |
| 18 | B to A | reqBlock P2 |
| 19 | A to B | defBlock P2 is "cat" |
| 20 | B to A | reqBlock P7 |
| 21 | A to B | defBlock P7 is V5, V4 |
| 22 | B to A | reqRef V5 |
| 23 | A to B | defRef V5 P1 |
| 24 | B to A | reqRef V4 |
| 25 | A to B | defRef V4 P4 |
| 26 | B to A | reqBlock P4 |
| 27 | A to B | defBlock P4 is "dog" |

Note that in step 23, where processor B is told that vBlockId V5 refers to block P1, block P1 has already been defined at processor B as a result of steps 14-15. Therefore, after step 23, it is not necessary to transmit block contents relating to P1 again, and transmission is complete once vBlockId V4 is dealt with.

In Example 5, the consequences of changing 'the cat ate the dog' to 'the mouse ate the dog' in Example 4 are considered.

TABLE 9

Representation of 'the mouse ate the dog'

| VID | PID | block contents | represents |
|---|---|---|---|
| V1 V5 | P1 | "the" | |
| | P2 | "cat" | |
| V3 | P3 | "ate" | |
| V4 | P4 | "dog" | |
| | P5 | V1, V2 | 'the mouse' |
| | P6 | P5, V3 | 'the mouse ate' |
| | P7 | V5, V4 | 'the dog' |
| V0 | P8 | P6, P7 | 'the mouse ate the dog' |
| V2 | P9 | "mouse" | |

Table 9 shows the block representation at processor A of the new sentence. Here a new "mouse" block (P9) is added, and the mapping of vBlockId V2 is changed from pBlockId P2 to pBlockId P9. Note that the contents of block P5 are the same on Tables 7 and 9, but that block P5 represents two different sentences on Tables 7 and 9 as a result of the changed mapping of V2. Transmitting this change to processor B can be accomplished with the message steps shown in Table 10.

TABLE 10

Message steps for Example 5.

| step | direction | message |
|---|---|---|
| 1 | A to B | defRef V2 P9 |
| 2 | B to A | reqBlock P9 |
| 3 | A to B | defBlock P9 is "mouse" |

Here transmission is very efficient, because the only information transmitted is the new "mouse" block, and an indication of which vBlockId should be mapped to the pBlockId of the new "mouse" block. It is not necessary to propagate changes in block pointers "up the data structure" as in Example 2.

In Example 6, the consequences of changing 'the cat ate the dog' to 'the cat ate up the dog' in Example 4 are considered.

TABLE 11

Representation of 'the cat ate up the dog'

| VID | PID | block contents | represents |
|---|---|---|---|
| V1 V5 | P1 | "the" | |
| V2 | P2 | "cat" | |
| V3 | P3 | "ate" | |
| V4 | P4 | "dog" | |
| | P5 | V1, V2 | 'the cat' |
| | P6 | P5, V3 | 'the cat ate' |
| | P7 | V5, V4 | 'the dog' |
| | P8 | P6, P7 | 'the cat ate the dog' |
| V5 | P9 | "up" | |
| | P10 | P5, P11 | 'the cat ate up' |
| | P11 | V3, V5 | 'ate up' |
| V0 | P12 | P10, P7 | 'the cat ate up the dog' |

Table 11 shows the block representation at processor A of the new sentence. Here a new block P9 is added for "up", and new blocks P10, P11, and P12 account for changed block pointers. Transmitting this change to processor B can be accomplished with the message steps shown below.

TABLE 12

Message steps for Example 6.

| step | direction | message |
|---|---|---|
| 1 | A to B | defRef V0 P12 |
| 2 | B to A | reqBlock P12 |
| 3 | A to B | defBlock P12 is P10, P7 |
| 4 | B to A | reqBlock P10 |
| 5 | A to B | defBlock P10 is P5, P11 |
| 6 | B to A | reqBlock P11 |
| 7 | A to B | defBlock P11 is V3, V5 |
| 8 | B to A | reqRef V5 |
| 9 | A to B | defRef V5 P9 |
| 10 | B to A | reqBlock P9 |
| 11 | A to B | defBlock P9 is "up" |

As in the preceding examples, the receiver only requests block definitions for blocks that are not already defined.

B. Exemplary Protocol

It is convenient to gather the preceding message definitions as follows.

1) reqBlock(pBlockId)—the receiver looks up the pBlockId and send back a defBlock message with the pBlockId and associated contents.

2) defBlock(pBlockId, contents)—the receiver looks up the contents in its memory to get a local pBlockId, allocating and initializing a local block if necessary. If the local pBlockId differs from the pBlockId provided by the transmitter, the receiver keeps track of the mapping of the transmitter pBlockId to the local pBlockId. The explicit pBlockId in this message allows it to be used to push data, as opposed to merely responding to queries.

3) reqRef(vBlockId)—the receiver looks up the vBlockId to determine its associated pBlockId and sends back a defRef with these values.

4) defRef(vBlockId, pBlockId)—the receiver checks whether the vBlockId is already defined in the receiver's VPBCM, allocating and mapping a local vBlockId if necessary. If the local vBlockId differs from the vBlockId provided by the transmitter, the receiver keeps track of the mapping of the transmitter vBlockId to the local vBlockId. The local vBlockId is mapped to the local pBlockId corresponding to the pBlockId specified in the message. If necessary, the definition of this pBlockId is requested from the transmitter (via a reqBlock message).

In an embodiment, the following further message is added:

5) deleteBlock(pBlockId)—the receiver removes the VPBCM entry corresponding to the specified pBlockId and decrements the reference count on the block associated with this mapping, freeing if the reference count has now gone to zero. This ensures that the sending node is then free to re-assign that pBlockId to a block having different contents.

C. Exemplary Protocol Operation

On the transmitter side, when a pointer field is changed, network update is performed by mapping this pointer field to the corresponding vBlockId, determining the pBlockId corresponding to the new value of the pointer, and then transmitting a defRef message specifying the new vBlockId-to-pBlockId mapping.

For example, if an object contains a "name" field whose value is specified by a pointer to a string buffer containing the string value, changing the name corresponding to specifying a new pointer value for this field, namely one pointing to a string buffer containing the new name. (One cannot just change that contents of the original string buffer in general because its contents may be shared with other uses of this string value, as commonly arises in modern string implementations).

To transmit this change, the transmitting side maps this field to a corresponding vBlockId, determines the pBlockId corresponding to the new string value, and transmits a defRef message with these values to the receiver. On the reception of this message, the receiver modifies its VPBCM for this connection to map the specified vBlockId to the specified pBlockId. If there is no such entry, an entry in the VPBCM is allocated and initialized in this form with a reference count of zero. If there was a pre-existing entry for this vBlockId in the receiver VPBCM, it decrements the reference count in the receiver VPBCM entry corresponding to the old pBlockId as part of changing this entry. If the receiver has no definition for the pBlockId, it can request a definition of the block corresponding to the pBlockId using the reqBlock message.

In one embodiment, this definition is provided by the original transmitter of the defRef message. In another embodiment, the network infrastructure/switch maintains a database of pBlockId to data and can respond to this reqBlock message. Similarly, the transmitter can maintain a local mapping per connection indicating the pBlockIds known to the receiver side. In this case, on forming the defRef message, if the specified pBlockId is not defined at the receiver side, a defBlock message is transmitted to the receiver first before sending the defRef message. The defBlock message specifies the pBlockId and the associated contents of the block.

On receiving a defBlock message, the receiver creates a definition for this pBlockId corresponding to values specified in the defBlock message. In some cases, the receiver may implement local re-mappings of pBlockIds and/or vBlockIds as provided by the transmitter. This may entail issuing one or more reqBlock messages to determine the definition of pBlockIds in these messages. The receiver increments the references to this pBlockId entry as part of this operation if the local representation depends on these entries.

If a defBlock contains a reference to vBlockId that is not defined locally, it can request the definition of the vBlockId using the reqRef message, which again either the transmitting node or the network switch infrastructure can respond to, similar to the reqBlock message processing.

With an embodiment using per-connection mapping on the transmitter side as well, on forming a defBlock message, the transmitter can detect block data containing references that are not defined at the receiver side. In this case, a defRef message is transmitted for each such vBlock reference and a defBlock message is transmitted to the receiver first for each such pBlockId reference before sending this first defBlock message.

Overall, logically contiguous data units can be represented as a hierarchical structure of blocks identified by pBlockIds, degenerating to a single data block for short data units. Structured data instances can be represented by including vBlockIds that effectively act as pointers. The transmission of these data instances relies on a consistent comprehension of this structuring at both the transmitting and receiving sides. In this manner, the receiver is able to reconstruct the data corresponding to a pBlockId, even if it corresponds to structured data.

Cumulative error can be handled by an audit that cross-checks with a CRC on the state, using resynchronization or reboot to recover when this fails. Also, smaller amounts of data are transmitted, thereby reducing the probability of undetected bit errors.

Practice of these approaches does not depend critically on details of processor to processor communication. The processors can communicate over a dedicated link, or they can be connected to a network or system that also provides communication to other processors. Serial network connections or parallel bus connections (e.g., for tightly coupled processors) can be employed for communication.

D. Variations

In one embodiment, the receiver reconstructs the data and provides this as the message "value" to the rest of the system, following the conventional model of message-level communication.

In another embodiment, the receiver maintains a mapping of pBlockId to a corresponding data structure in the receiver's memory and updates the memory accordingly. For example, update of a vBlockId mapping to change the name of an object in the example used earlier can map by vBlockId to a field in an object in the receiver's memory, causing it to be updated with the value corresponding to the new pBlockId, i.e. directly changing this receiver object's name. In this case, this receiver object would typically be a proxy for the transmitter's corresponding object, or vice versa. In a variant of this embodiment, the receiver maintains its memory state internally in terms of immutable blocks, as described in U.S. patent application Ser. No. 12/011,311, "Hierarchical Immutable Content-Addressable Memory Processor" by the present inventor, filed on Jan. 25, 2008, and incorporated by reference in its entirety. In this situation, the mapping is direct between changes received over the network and the changes performed to receiver memory state.

Similarly, on the transmission side, the network controller can support transmission of structured messages by translating the data to blocks and blockIds as described above, providing a service interface similar to conventional network controllers but with support for structured data. In this case, it requires a transmit-side directory to map block units to blockIds. In particular, in the basic data case, the data element to be communicated is located in the transmit side directory for the connection over which the data is to be transmitted, in the sense of locating the entry corresponding to this data element. This entry specifies the blockId to use for transmission. The blockId is then transmitted in place of the data. If the data contains pointers, mapping in the directory maps to an entry corresponding to data with each pointer field replaced by the corresponding blockId for the pointer. If no entry exists corresponding to this block, a block definition message is generated and transmitted that indicates the assigned blockId and its associated contents. This process proceeds recursively. That is, if the original block contains pointers, the blockId corresponding to each pointer must be determined in the directory, so a definition for that pointer and its associated blockId are transmitted first before the original block definition is transmitted (to avoid the callback behavior of the receiver using reqBlock).

For example, Table 13 below shows a sequence of transmission steps for the sentence of Example 1 using the above approach for avoiding receiver callback.

TABLE 13

Message steps for Example 1, with callback avoided.

| step | direction | message |
|------|-----------|---------|
| 1 | A to B | defBlock P1 is "the" |
| 2 | A to B | defBlock P2 is "cat" |
| 3 | A to B | defBlock P5 is P1, P2 |
| 4 | A to B | defBlock P3 is "ate" |
| 5 | A to B | defBlock P6 is P5, P3 |
| 6 | A to B | defBlock P4 is "dog" |
| 7 | A to B | defBlock P7 is P1, P4 |
| 8 | A to B | defBlock P8 is P6, P7 |

Here receiver callback is avoided by sending the blocks from A to B in an order such that any pointer in the blocks refers to a previously sent block.

In another embodiment, the network controller can be notified of changes to a memory object and automatically translate this change to the corresponding message. For example, it could determine that the change of a name of an object corresponds to changing a vBlockId-to-pBlockId mapping, and automatically generate this message with the appropriate values. Similarly, if a geometric description of some object is updated, the transmitter attempts to send this update to the receiver, possibly causing a defBlock message (or several) because the downstream does not have this revised blockId defined. (It may have because, for instance, another proxy contains this description.)

In a variant of this embodiment, the host system represents objects in its internal state in an immutable block structure, as described in U.S. patent application Ser. No. 12/011,311, "Hierarchical Immutable Content-Addressable Memory Processor" (HICAMP) by the present inventor, filed on Jan. 25, 2008. This allows a direct mapping from internal state changes to vBlockIds and pBlockIds. In this case, the connection VPBCM is effectively a local proxy for the remote node VPBIM (which is the virtual to physical block ID mapping for the remote node memory). With each node implementing the HICAMP memory architecture, communication as described above provides a means to coordinate between the multiple memory controllers of the different nodes to provide efficient cluster operation of HICAMP nodes.

The receiver can maintain zero or more root vBlockIds associated with a connection, normally designated at the time that the connection is established. These have a corresponding entry in the VPBCM mapping for the connection. All other objects that are maintained by the connection are referenced directly or indirectly from these roots. In the case of mapping to object state in the network controller, the root vBlockIds correspond to top-level proxy objects created as part of establishing the connection between two communicating nodes.

A quota in terms of size of data can be specified for the input processor, limiting the amount of data being created by it, preventing a remote node for using an excessive amount of memory in the receiving node. This limit can be in terms of new blocks or in terms of logical blocks, i.e. the logical size of the value being transmitted. One can also limit the size of any value based on the data type.

E. Reference Counting and Block Deallocation

Preferably, reference counting is employed to determine which immutable blocks are in use (i.e., have one or more references) and which blocks are not in use (i.e., have no references).

The reference count per entry in the per-connection VPBCM reflects the number of references by other entries in the VPBCM if not a root entry. Thus, a VPBCM entry is not freed until it is not referenced, and it is referenced as long as it appears in an object that is part of this connection.

If a block is freed, the associated VPBCM entry is invalidated and a deleteBlock message is sent upstream, causing the upstream node to clear this entry from its map. Typically, a block is referenced at least by the proxy object that contains this value in one of its fields so the block is not freed as long as that it is the case. Moreover, because the network input processor creates a reference to the current block it is receiving, a received block is referenced until it is written to some object. In the case of a non-root block, subsequent blocks are received that reference this received block, the same as for local blocks.

If a connection is reset, re-synchronization of the proxies causes automatic re-synchronization of the block state. In particular, a defBlock operation is sent for each block being used on the connection.

F. Bandwidth Analysis

A significant advantage provided by these methods can be appreciated by considering how many bytes need to be transmitted in order to change a single byte in a data structure. In conventional approaches, the amount of data needed to transmit a single-byte update of a data structure is frequently unbounded. According to the above-described approaches, the transmission requirements can be on the order of B, where B is the block size, because the update can be transmitted by sending the revised block along with a remapping of the pertinent vBlockId (as in Example 5).

Even in cases where a mapping of vBlockIds to pBlockIds is not employed, the transmission requirement would be on the order of B*log(N) for an N-block data structure, assuming a tree-like organization of the data structure (as in Example 2). Here the log(N) factor comes from the depth of the data structure, because one pointer change (and associated block change) would occur at each level of the data structure in this situation.

G. Temporary Block IDs

In a situation where there is a central (master) node and peripheral (slave) nodes, the blockId space can optionally be divided into normal blockIds and transient blockIds. The central node only uses the normal blockIds on allocation. The peripheral processors allocate new blocks with transient blockIds (and use transient virtual blockIds). When a peripheral processor creates new state or modifies existing state that entails allocating a new block, it uses a transient blockId for each such block. The peripheral processor can use transient vBlockIds as well when instantiating a new pointer instance in some state. It then transmits this update to the central processor, which then reflects back the update to each peripheral processor in terms of normal blockIds. The update-originating peripheral processor then updates its state with the blocks and V-to-P mapping specified by the central processor. Consequently, the peripheral processors end up with the same pBlockIds as those assigned by the central processor so there is no need for a local mapping of pBlockIds.

Moreover, once the update is received/reflected back to the peripheral processor, the local state of this peripheral processor is updated so that it not longer references the transient blockIds, causing their ref count to go to zero so they are automatically freed. Thus, the peripheral processor can cause its state to be updated immediately and then concurrently/asynchronously perform this interaction with the central node to convert the blockId allocation to be in synch with the central node. Furthermore, the number of transient blocks required depends on the number of blocks per peripheral processor that can be in the process of being updated in this form, which is normally a small percentage relative to the entire memory state. Any use of comparison by blockId between normal and transient blockIds can be detected in hardware so it can determine not to rely on blockId comparison in that case being equivalent to block content comparison.

With this central blockId assignment, it is feasible for the processors in a cluster to share a common system memory, indexed by blockId, with each processor potentially caching blocks for fast response. In this case, there is a per-processor area in this system memory for transient blocks allocated by this processor. In this configuration, the system is distributed at the control and data caching level, but uses a common main memory, avoiding full duplication of state between processors. Moreover, updates can be transmitted from a peripheral processor to the central processor by transient blockId only, given that the content is available to the central processor from its location in the system memory. This configuration may be appropriate for multi-core processor chips where the number of cores exceeds that feasible to synchronize at the level of conventional shared memory.

As a variant on the above, the peripheral processor could instead generate the update in some separate representation that did not entail blocks, transmit to the central processor, which then reflects back in block form and protocol as above. However, this variant would mean that blockIds cannot be used to reduce the amount of communication from peripheral processor to central processor to transmit the update.

System level block IDs can be employed with either shared processor memory or with independent processor memory. The use of shared processor memory (in combination with local caching to improve speed) can provide more efficient use of memory resources. The use of independent processor memory can improve bandwidth and fault tolerance.

H. Multiple Memory Banks

The system memory for a multi-processor system can optionally be partitioned into k banks with a memory controller per bank. There is a hash function on block contents mapping to one of the k banks. When a processor needs to create a new block, it creates a transient block as noted in the centralized scheme, but then it communicates with the i-th memory controller, as designated by the hash of the block contents that is needed. Each memory controller is allocated a disjoint partition of the pBlockId space so it can allocate a pBlockId for the block without conflict with other memory controllers. This partition also allows a processor to map a pBlockId to the associated memory controller in order to read the block. This scheme allows multiple memory banks/controllers to scale the system and preserves the required duplicate suppression of blocks, without requiring the translation mapping of pBlockIds between processors of the general scheme.

I. Duplicate Suppression and Canonical Representation of Multi-Block Data

Suppression of block duplicates improves efficiency of data storage and transmission. Accordingly, it is preferred to enforce a convention whereby block duplicates are avoided. Returning to the examples above, suppose processor A transmits a "cat" block to processor B which already has a "cat" block defined. In this situation, processor B uses the ID of the "cat" block it already has in the data structure it constructs in response to A's transmissions. Processor B also keeps track of the ID that processor A uses for "cat", so that it can avoid asking for a definition of that ID more than once. In this kind of situation, it can be helpful to regard blocks as being content-identified (i.e., identified by content as opposed to ID). In this point of view, for example, one keeps track of the various global and/or local IDs given to the "cat" block. Because of block uniqueness, no ambiguity can be introduced in identification of blocks by their contents.

In order to provide the benefits of duplicate suppression for multi-block data structures, it is preferred to define a canonical form for multi-block data that ensures a unique representation. For example, in a system with 3-character blocks, "abcde" could be represented using blocks "abc" and "de" or using blocks "ab" and "cde". To remove this ambiguity, a canonical form can be imposed. For example, each level in a directed acyclic graph can be required to be filled completely from left to right before adding anything at the next level down (i.e., further from the root). Furthermore, data blocks can be required to be fully occupied with data as much as possible, so that there is at most one partially full data block. The partially full data block (if any) can be required to be at the end of its data structure. Any other way of enforcing a unique representation for multi-block data can also be employed.

The invention claimed is:

1. A method for transmitting data from a first processor to a second processor, the method comprising:
   representing some or all data on said first and second processors with data structures comprising immutable blocks, wherein contents of said immutable blocks can include data and/or pointers to said immutable blocks;
   transmitting transfer data from said first processor to said second processor, wherein:
      said transfer data is represented as one or more of said data structures comprising immutable blocks, and wherein said immutable blocks of said one or more data structures are a set of transfer blocks;
      transmitting transfer data includes:
         transmitting contents of said first set of transfer blocks to said second processor; and
         transmitting identification of said second set of transfer blocks to said second processor;
   determining a first set of said transfer blocks that have not been previously defined on said second processor;
   determining a second set of said transfer blocks that have been previously defined on said second processor; and
   maintaining a system-wide labeling of said immutable blocks in a system including at least said first and second processors, including:
      assigning physical block IDs to said immutable blocks at a master processor;
      providing a mapping of virtual block IDs to said physical block IDs at said master processor;
      assigning temporary block IDs to said immutable blocks at one or more slave processors; and
      automatically and equivalently replacing said temporary block IDs with said physical block IDs and said virtual block IDs as provided by said master processor.

2. The method of claim 1, wherein said data structures comprising immutable blocks are organized as directed acyclic graphs, linked by pointers included in contents of said immutable blocks.

3. The method of claim 1, further comprising deallocating one or more of said transfer blocks.

4. The method of claim 1, wherein each of said immutable blocks on said first processor has a physical block ID, and further comprising maintaining a first virtual block ID to physical block ID mapping for said immutable blocks on said first processor, wherein said mapping is mutable.

5. The method of claim 1, wherein each of said immutable blocks on said second processor has a physical block ID, and further comprising maintaining a second virtual block ID to physical block ID mapping for said immutable blocks on said second processor, wherein said mapping is mutable.

6. The method of claim 5, further comprising maintaining a virtual mapping of said virtual block IDs to local virtual block IDs of said second processor.

7. The method of claim 1, further comprising maintaining a local physical mapping of said physical block IDs to local physical block IDs of said second processor.

8. The method of claim 1, wherein said immutable blocks are stored in a memory shared by at least said first and second processors.

9. The method of claim 1, wherein said immutable blocks are independently stored in separate memory units associated with at least said first and second processors.

10. The method of claim 1, wherein a reference count is maintained for each of said transfer blocks, and wherein each said transfer block is deallocated if and only if a corresponding one of said reference counts become zero.

11. The method of claim 1, further comprising:
   providing a canonical representation of multi-block data to ensure unique representation of multi-block data;
   enforcing non-duplication of immutable blocks having the same contents at said first and second processors, whereby said immutable blocks can be content-identified.

12. The method of claim 1, wherein the first processor is designated as the master processor.

13. A computer program product for transmitting data from a first processor to a second processor, the computer program product being embodied in a computer readable non-transitory storage medium and comprising computer instructions for:
   representing some or all data on said first and second processors with data structures comprising immutable blocks, wherein contents of said immutable blocks can include data and/or pointers to said immutable blocks;
   transmitting transfer data from said first processor to said second processor, wherein:
      said transfer data is represented as one or more of said data structures comprising immutable blocks, and said immutable blocks of said one or more data structures are a set of transfer blocks;
      transmitting transfer data comprises:
         transmitting contents of said first set of transfer blocks to said second processor; and
         transmitting identification of said second set of transfer blocks to said second processor;
   determining a first set of said transfer blocks that have not been previously defined on said second processor;
   determining a second set of said transfer blocks that have been previously defined on said second processor; and
   maintaining a system-wide labeling of said immutable blocks in a system including at least said first and second processors, including:
      assigning physical block IDs to said immutable blocks at a master processor;
      providing a mapping of virtual block IDs to said physical block IDs at said master processor;
      assigning temporary block IDs to said immutable blocks at one or more slave processors; and
      automatically and equivalently replacing said temporary block IDs with said physical block IDs and said virtual block IDs as provided by said master processor.

14. The computer program product of claim 13, wherein said data structures comprising immutable blocks are organized as directed acyclic graphs, linked by pointers included in contents of said immutable blocks.

15. The computer program product of claim 13, wherein each of said immutable blocks on said first processor has a physical block ID, and the computer program product further comprising computer instructions for maintaining a first virtual block ID to physical block ID mapping for said immutable blocks on said first processor, wherein said mapping is mutable.

16. The computer program product of claim 13, wherein said immutable blocks are stored in a memory shared by at least said first and second processors.

17. A computer system comprising:
   a first processor, a second processor, and a controller coupled to the first processor and the second processor, to:
      represent some or all data on said first and second processors with data structures comprising immutable blocks, wherein contents of said immutable blocks can include data and/or pointers to said immutable blocks;
transmit transfer data from said first processor to said second processor, wherein:
  said transfer data is represented as one or more of said data structures comprising immutable blocks;
  said immutable blocks of said one or more data structures are a set of transfer blocks;
  transmitting transfer data includes:
    transmitting contents of said first set of transfer blocks to said second processor; and
    transmitting identification of said second set of transfer blocks to said second processor;
determine a first set of said transfer blocks that have not been previously defined on said second processor;
determine a second set of said transfer blocks that have been previously defined on said second processor; and
maintain a system-wide labeling of said immutable blocks in the computer system, including to:
  assign physical block IDs to said immutable blocks at a master processor;
  provide a mapping of virtual block IDs to said physical block IDs at said master processor;
  assign temporary block IDs to said immutable blocks at one or more slave processors; and
  automatically and equivalently replace said temporary block IDs with said physical block IDs and said virtual block IDs as provided by said master processor.

18. The computer system of claim 17, wherein said data structures comprising immutable blocks are organized as directed acyclic graphs, linked by pointers included in contents of said immutable blocks.

19. The computer system of claim 17, wherein:
each of said immutable blocks on said first processor has a physical block ID; and
the first processor, the second processor, and the controller are further to maintain a first virtual block ID to physical block ID mapping for said immutable blocks on said first processor; and
said mapping is mutable.

20. The computer system of claim 17, wherein said immutable blocks are stored in a memory shared by at least said first and second processors.

* * * * *